United States Patent [19]
Côté

[11] Patent Number: 5,365,975
[45] Date of Patent: Nov. 22, 1994

[54] CONSTANT AIR PRESSURE UNIT FOR AIR HANDLING SYSTEM

[75] Inventor: Anthony Côté, Prévost, Canada

[73] Assignee: E. H. Price Ltd., Winnipeg, Canada

[21] Appl. No.: 215,593

[22] Filed: Mar. 22, 1994

[51] Int. Cl.$^5$ .............................................. F16K 11/00
[52] U.S. Cl. ................................ 137/875; 137/527.8; 137/877
[58] Field of Search ................ 137/527.8, 875, 876, 137/877; 454/338, 340, 348

[56] References Cited

U.S. PATENT DOCUMENTS

| | | | |
|---|---|---|---|
| 3,854,502 | 12/1974 | Mott | 137/629 |
| 4,011,662 | 3/1977 | Davis et al. | 137/877 X |
| 4,315,415 | 2/1982 | Wilson | 137/527.8 X |
| 4,799,513 | 1/1989 | Strong et al. | 137/625.48 |

FOREIGN PATENT DOCUMENTS 1309335  10/1962  France ................. 137/877

*Primary Examiner*—John C. Fox

[57] ABSTRACT

A constant air pressure unit for an air handling system. The unit comprises a housing having an air inlet opening for admitting pressurized air into the housing. The housing has a top wall with a by-pass opening therein and a door is displaceably retained over the by-pass opening. The door has a predetermined load whereby the door is caused to lift away from the by-pass opening when the pressure of the air in the housing is equal to the pressure required to lift the load. The door load defines a maximum housing pressure. In the case where the pressure at the inlet opening starts to increase above the predetermined maximum housing pressure, the door lifts and by-passes the excess pressurized air and thus limits the inlet and housing pressures. In a corollary unit, an air outlet opening for releasing air is included. A pressurized airflow path is defined between the inlet opening and the outlet opening. The outlet airflow is restricted by the use of an adjustable restrictor blade which will start to increase the pressure in the housing. With the door load selected for a desired inlet pressure, the excess pressurized air is then evacuated through the by-pass opening so as to maintain a substantially constant air pressure at the inlet and thus a substantially constant inlet airflow volume rate with a variable outlet airflow volume rate.

11 Claims, 4 Drawing Sheets

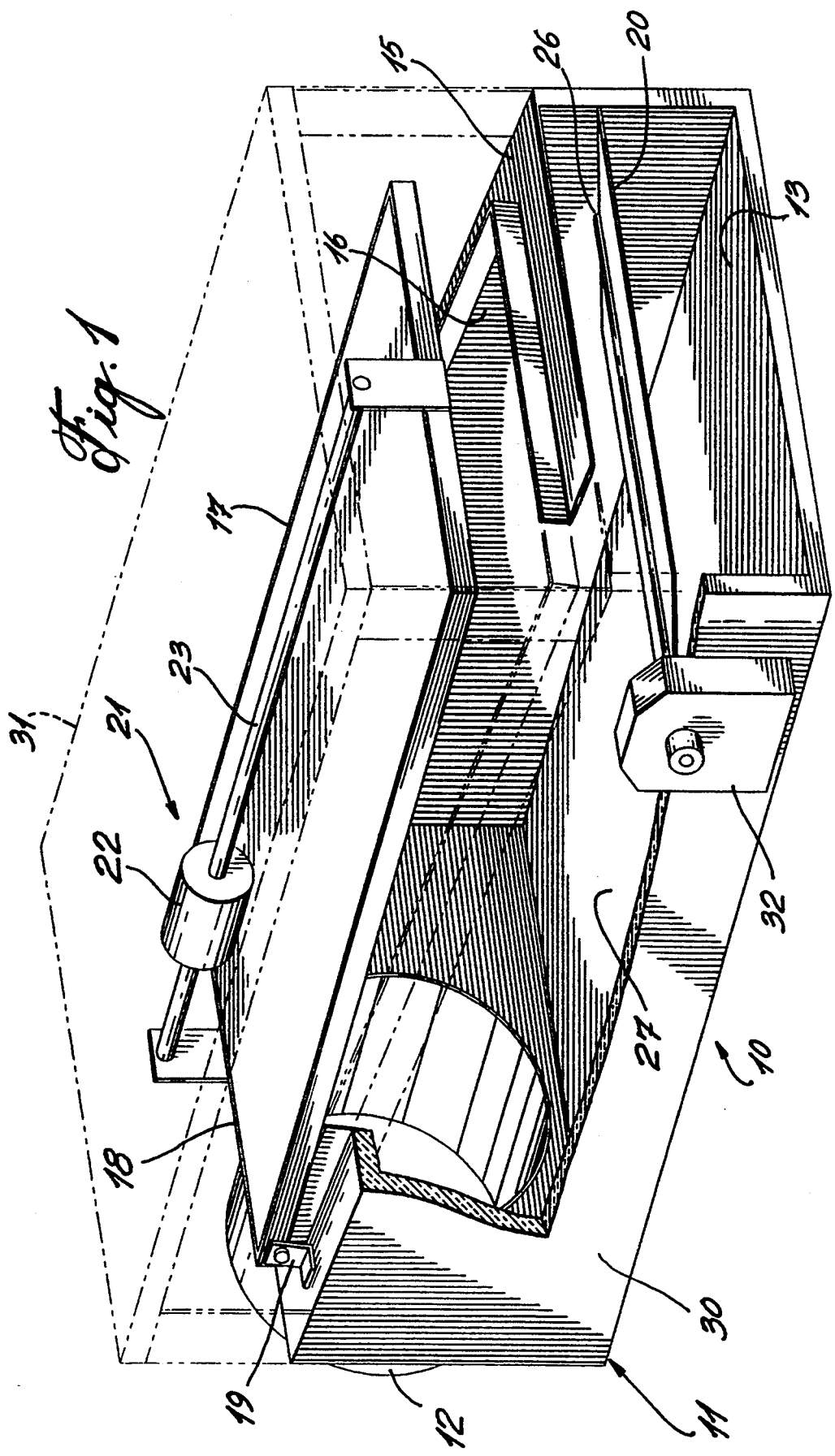

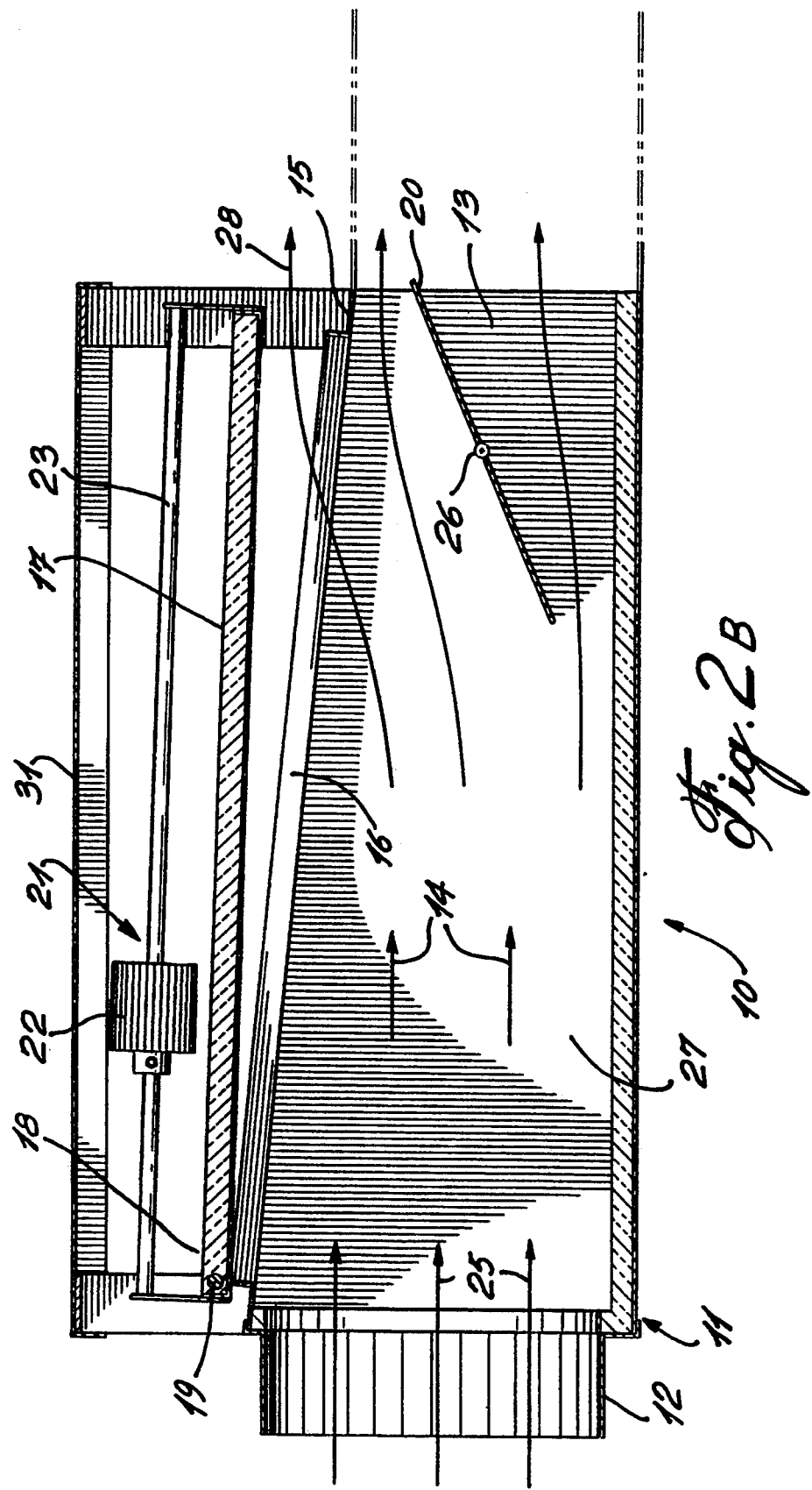

CONSTANT AIR PRESSURE UNIT FOR AIR HANDLING SYSTEM

TECHNICAL FIELD

The present invention relates to a constant air pressure unit for an air handling system and is comprised of a housing having an inlet opening and a by-pass opening in the top wall of the housing, and further wherein a door is displaceably retained over the opening, with the door being lifted off the opening under the influence of an increase in pressure in the housing such as to maintain a substantially constant maximum pressure at the inlet openings. The present invention also relates to the application of the constant pressure unit as a terminal unit for use in an air handling system wherein an outlet opening is added to deliver conditioned air to a space to be conditioned and an adjustable outlet restrictor blade is added to vary the volume of conditioned air leaving the unit. In response to the variation in conditioned air leaving the constant pressure unit, the displaceably retained door will lift off the by-pass opening and divert any excess air through the by-pass outlet while maintaining a constant pressure and a constant volume flow at the inlet to the unit.

BACKGROUND ART

Constant pressure units are generally referred to as constant pressure dampers or grilles and are used in the control of the airflow in and out of pressured "clean" environments such as hospital operating theatres, electronic components fabrication, and all other applications requiring a tight control on contaminants entering the "clean conditions" environment. As background information to this invention, reference is made to British Patent No. 931,526 published Jul. 17, 1963 and entitled "Improvements in and Relating to Damper Valves".

In the application of the constant air pressure unit as a terminal unit in air handling systems, the unit is used to divert excess conditioned air entering the unit as the airflow leaving the unit is varied. This is generally referred to in the art as a by-pass terminal unit. As background information, reference is made to U.S. Pat. No. 5,044,402 relating to a variable air volume terminal unit as well as to our copending U.S. application Ser. No. 08/165,603, filed on Dec. 13, 1993 relating to a sliding gate terminal unit for an air handling system. The underlying principle in air handling systems using by-pass terminal units is that the airflow at the supply fan remain constant and, in consequence, the airflow at each terminal unit should remain constant as the conditioned air delivered to each space to be conditioned varies as the requirements of the space being conditioned change. With by-pass terminal units of the prior art, the airflow at the inlet increases as the unit cycles the airflow between the outlet opening and the by-pass opening, the maximum increase being attained at or near mid-cycle. To understand this problem with the prior art, let us consider the flow characteristics of the air handling duct system. The individual duct systems upstream and downstream from the by-pass terminal unit have their predetermined airflows and thus their predetermined pressure loses since they are of fixed cross-sections and length. The quantity of pressure required to move the desired amount of air through the ducts varies as per the following formula:

$$Pressure = Constant \times Velocity^2$$

where the constant depends on the duct geometry.

To reduce the quantity of air in a given duct system while maintaining the same pressure at the entrance, it is necessary to increase the resistance to the flow of air in the duct system, i.e. add restrictions such as dampers. For example, let us define three duct systems: one from the supply fan to the inlet of the by-pass box, one from the inlet of the by-pass box to the conditioned space and one from the inlet of the by-pass box through the by-pass outlet and a manually adjustable balancing damper. Let us suppose for case of argument that through the use of the manual balancing damper, the frictional losses are equal in the two later duct systems in this example. In by-pass units of the prior art, as the diverter blade moves the conditioned air from one of these two later duct systems to the other, the velocity in one duct will drop as the other will increase from zero. In the mid-cycle position of the diverter blade, the air velocity in each duct system will be half of its previous maximum: there are now two outlets for the same quantity of air. With the reduction in air velocity, the frictional losses have been reduced and less pressure is now required to deliver the air to the conditioned space and the by-pass outlet. In the prior art, several shapes and methods of mounting the diverter blade have been proposed without adequately compensating for this problem. In response to the change in pressure requirements, the velocity through all three duct systems will then increase until the loss of pressure has been compensated for. This translates into an increase of the airflow at the supply fan. In the case where several by-pass boxes in the system are subjected to the same conditions, the increase in airflow at the supply fan may become more than the supply fan motor can handle. In known by-pass boxes on the market today, supply fan motors must be oversized to protect against the above eventuality and use more power than would be theoretically necessary if no variations in system pressure were created by the by-pass box.

SUMMARY OF INVENTION

It is a feature of the present invention to provide a constant air pressure unit for an air handling system that substantially overcomes the above-mentioned disadvantages of the prior art and wherein the unit is constructed with few moving parts as compared with prior art units.

According to a further feature of the present invention, there is provided a constant air pressure unit for an air handling system wherein a by-pass opening is provided in the top wall of the housing of the unit and a door is provided which is displaceably retained over the opening. The door is caused to lift off the opening when the air pressure at the opening exceeds a predetermined pressure that is substantially equal to the weight of the door divided by the area of the opening so as to maintain a constant inlet pressure and thus a constant inlet flow as the volume of air at the outlet opening is varied.

Another feature of the present invention is to provide a constant air pressure unit for an air handling system wherein the displaceable door, retained over the by-pass opening, is a hinged door having an adjustable load to adjust the predetermined pressure required to open the by-pass opening.

According to the above features, from a broad aspect, the present invention provides a constant air pressure unit for an air handling system. The unit comprises a housing having an air inlet opening for admitting pressurized air into the housing. An air outlet opening is also provided for releasing the air to the space to be conditioned. A pressurized airflow path is defined between the inlet opening and the outlet port. The housing has a top wall with a by-pass opening therein. A door is displaceably retained over the by-pass opening. An outlet restricting means is provided to vary the volume of air discharged through the outlet opening. The door is provided with loading means to cause the door to lift off the by-pass opening when the pressure of the airflow in the housing exceeds the pressure of the air at the inlet opening and thus evacuate the excess pressurized air in the housing so as to maintain a constant inlet pressure and airflow.

BRIEF DESCRIPTION OF DRAWINGS

A preferred embodiment of the present invention will now be described with reference to the accompanying drawings in which:

FIG. 1 is a fragmented perspective view showing a constant air pressure unit for an air handling system constructed in accordance with the present invention;

FIGS. 2A to 2C are schematic views illustrating the operation of the constant air pressure unit of the present invention.

DESCRIPTION OF PREFERRED EMBODIMENTS

Figure 2A:
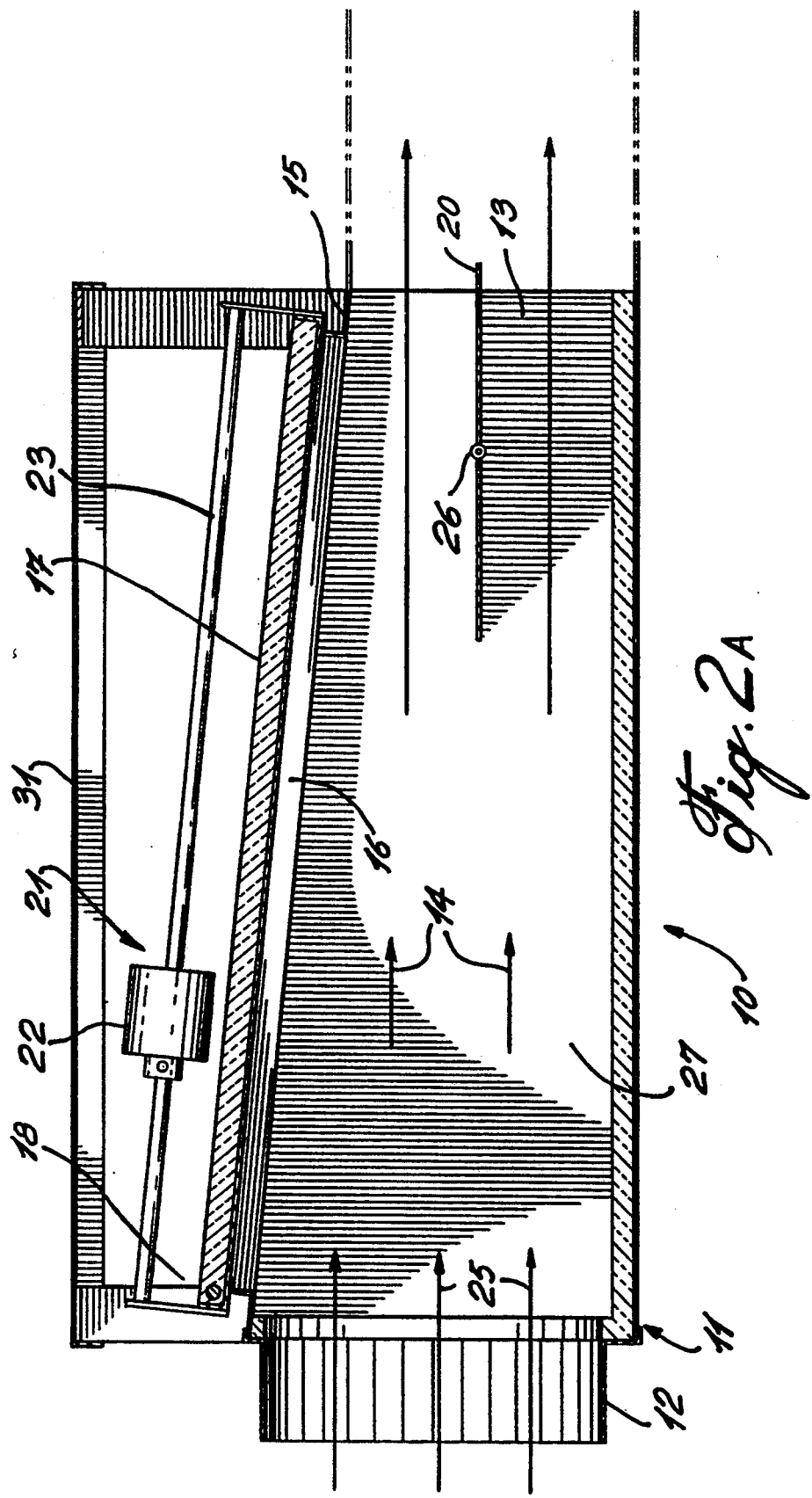

Referring now to the drawings, there is shown generally at 10, a constant air pressure unit constructed in accordance with the present invention and for use in an air handling system. The unit 10 comprises a housing 11 having an air inlet opening 12 for admitting pressurized air from an air distribution system (not shown). An air outlet opening 13 is provided for releasing air at varying airflow rates. A pressurized airflow path 14 (see FIG. 2A) is defined between the inlet opening 12 and the outlet opening 13.

As shown in FIG. 1, the housing has a top wall 15 in which a by-pass opening 16 (see FIG. 2B or 2C) is formed. A door 17 is hingedly secured at one end 18 thereof by a hinge connection 19. An outlet restriction means in the form of a blade 20 is secured within the housing adjacent to the outlet opening 13 downstream of the by-pass opening 16 and varies the surface area of the outlet opening 13, and accordingly the volume of air discharged through the outlet opening.

As shown again in FIG. 1, the door 17 has a loading means 21, herein a variable Load consisting of a weight element 22 supported on a support rod 23 which is secured to the door 17. Accordingly, the downward load on the door 17 is adjustable by moving the weight element 22 closer to the door end 18 and the hinge 19. The position of the weight on the rod determines the force of the pressure in the housing required to lift the door and release air.

Figure 2C:
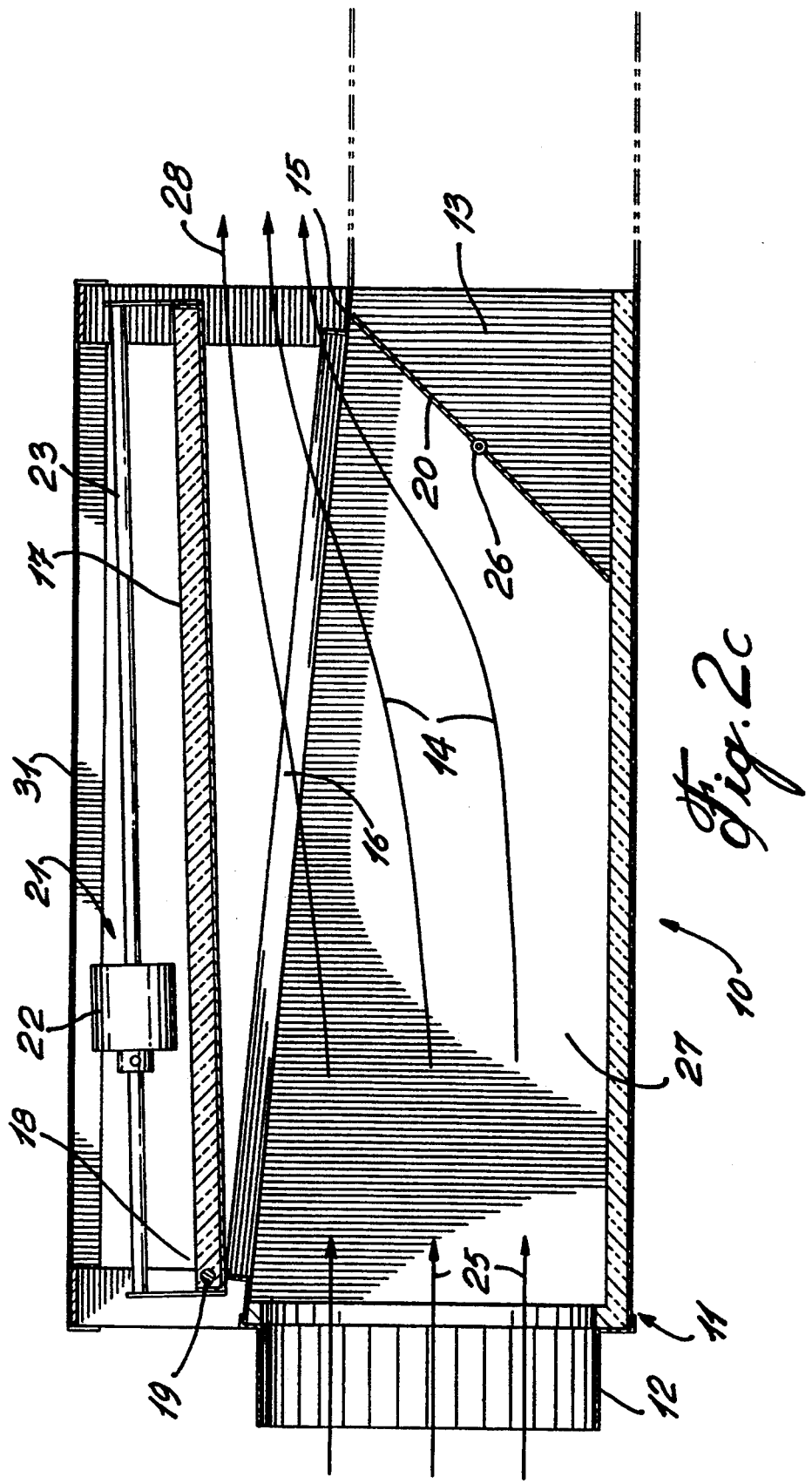

As shown in FIG. 2A, when the restriction blade 20 is in its fully open position, the pressurized air 25 at the inlet opening 12 moves straight through the housing to the outlet opening 13. When the restriction blade 20 is rotated on its pivot 26, as shown in FIG. 2B, the surface area of the opening diminishes and accordingly the volume of air discharged is reduced, and the pressure of air in the chamber 27 will tend to increase due to the resistance presented by the surface area of the restriction blade 20. In order to maintain a substantially constant pressure at the inlet opening 12, when the volume is varied, it is necessary to maintain the pressure within the chamber 27 of the housing 11 substantially constant. This is done automatically by the door 17 and, as herein shown in FIG. 2B, when the air pressure within the chamber 27 increases due to movement of the blade 20, the door 17 will automatically lift and pivot to release the excess air pressure 28 through the by-pass opening 16. When the restriction blade 20 is fully closed, see FIG. 2C, all the air from the inlet opening 12 is diverted totally through the by-pass opening 16 causing the door to lift to a balanced opening position without an increase of pressure. The restriction blade 20 is controlled by an electric actuator 32 or other control means that may be secured on the side wall 30 of the constant air pressure unit 10.

The constant air pressure unit 10 may be provided with a protective roof wall 31 to avoid any debris from falling on the door 17 and changing its weight. The by-pass air may be discharged directly within a return air plenum (not shown) or a recirculating duct (not shown) could be secured over the door so that the air is released directly within the return air duct of an air handling system, as is well known in the art. The top wall 15 of the unit, as herein shown, is inclined to permit the door 17 to move within the space defined between the top wall 15 and the roof wall 31.

It is also pointed out that the door 17 may be provided with a constant load or weight, and this can be done by constructing the door with materials of predetermined weight or securing a weight directly on the top of the door. Accordingly, the load may not be adjustable and the door would open when a predetermined pressure within the housing chamber is exceeded for a specific application.

A further application of the constant air pressure unit 10 is to act as a maximum pressure relief valve wherein the outlet opening 13 is not included so that any increase in pressure at the inlet opening 12 is automatically released through the by-pass opening 16.

It is within the ambit of the present invention to cover any obvious modifications provided such modifications fall within the scope of the appended claims.

I claim:

1. A constant air pressure unit for an air handling system, said unit comprising a housing having an air inlet opening for admitting pressurized air in said housing, said housing having a top wall with a by-pass opening therein, a door displaceably retained over said by-pass opening, said door having loading means whereby said door is caused to lift away from said by-pass opening when the pressure of said airflow in said housing exceeds the pressure required to lift said load of said door and to release excess pressurized air at a substantially constant pressure from said housing so as to maintain a substantially constant maximum air pressure at said air inlet.

2. A constant air pressure unit as claimed in claim 1 wherein said housing has an air outlet opening for releasing pressurized air, a pressurized airflow path defined between said inlet opening and said outlet opening, an outlet restriction means at said outlet opening for varying the outlet airflow volume, said door of said by-pass opening releasing excess pressurized air in said housing created by the drop in said outlet airflow volume, at said substantially constant pressure, and dependent on the position of said outlet restriction means so as to maintain a substantially constant inlet airflow volume and said inlet airflow pressure.

3. A constant air pressure unit as claimed in claim 2 wherein said outlet restriction means is a damper blade.

4. A constant air pressure unit as claimed in claim 3, wherein said by-pass opening is in communication with a return air duct of said air handling system.

5. A constant air pressure unit as claimed in claim 3, wherein said by-pass opening is in communication with a plenum space.

6. A constant air pressure unit as claimed in claim 1, wherein said door is a hinged door hingedly secured to said top wall, said door hinging outwardly of said top wall to open said by-pass opening a predetermined amount dependent on the quantity of said pressurized air to be released.

7. A constant air pressure unit as claimed in claim 1, wherein said loading means is constituted by a predetermined weight of said door.

8. A constant air pressure unit as claimed in claim 1, wherein said loading means is a variable load securable to said door.

9. A constant air pressure unit as claimed in claim 8, wherein said variable load comprises a support having a weight displaceably secured thereto and positionable at a predetermined location therealong where it is arrested, said support being secured over a top wall of said door and extending axially thereof from a hinged end of said door to a free end thereof.

10. A constant air pressure unit as claimed in claim 1, wherein said top wall of said housing is an inclined wall sloping downwardly from said inlet opening to said outlet opening of said housing, said door having a hinge connection on said top wall adjacent said inlet opening.

11. A constant air pressure unit as claimed in claim 10, wherein there is further provided a protective roof wall connected to said housing and spaced above said door to prevent debris from falling on said door to affect the weight thereof.

* * * * *